United States Patent [19]

Goheen et al.

[11] 4,022,965

[45] May 10, 1977

[54] PROCESS FOR PRODUCING REACTIVE, HOMOGENEOUS, SELF-BONDABLE LIGNOCELLULOSE FIBERS

[75] Inventors: David W. Goheen, Camas, Wash.; John S. Barton, Orinda, Calif.

[73] Assignee: Crown Zellerbach Corporation, San Francisco, Calif.

[22] Filed: Jan. 13, 1975

[21] Appl. No.: 540,354

[52] U.S. Cl. .................................. 536/56; 162/24; 162/26; 162/65; 162/78; 241/28
[51] Int. Cl.² ...................... C08B 1/00; D21B 1/04
[58] Field of Search ............... 260/212; 162/24, 26, 162/65, 78; 536/56; 241/28

[56] References Cited
UNITED STATES PATENTS

| | | | |
|---|---|---|---|
| 2,247,208 | 6/1941 | Schorger | 260/212 |
| 2,368,527 | 1/1945 | Edelstein | 260/212 |
| 3,023,140 | 2/1962 | Textor | 162/24 |
| 3,069,309 | 12/1962 | Fennell | 162/78 |
| 3,193,445 | 7/1965 | Parker et al. | 162/78 |
| 3,492,199 | 1/1970 | Kindron et al. | 162/78 |
| 3,719,552 | 3/1973 | Farley et al. | 162/78 |
| 3,900,334 | 8/1975 | Brink | 260/212 |
| 3,915,959 | 10/1975 | Goheen et al. | 260/231 CM |

*Primary Examiner*—Ronald W. Griffin
*Attorney, Agent, or Firm*—Jerome S. Marger; Corwin R. Horton

[57] ABSTRACT

A novel process for producing reactive, homogeneous, self-bondable lignocellulose fibers is provided in which individual, separate, lignocellulose fibers are oxidatively modified, employing oxidative reagent system. Pursuant to the teachings of the present invention, the oxidative modification step is conducted in a controlled manner, for example, employing a confrication step, using a liquid-phase reagent system, the subject product fibers, prior to sheet formation, being substantially free of residual oxidative reagent. Sheets are formed from the product fibers on subsequent bonding, employing mild formation conditions, the sheets having improved dry- and wet-strength properties.

29 Claims, 1 Drawing Figure

PROCESS FOR PRODUCING REACTIVE, HOMOGENEOUS, SELF-BONDABLE LIGNOCELLULOSE FIBERS

BACKGROUND OF THE INVENTION

The prior art includes many processes which employ resins, glue, or other like binder materials to bond cellulosic fibers, to form solid composite sheets. Other systems, for example, such as provided in U.S. Pat. No. 1,631,173 to Weiss, relate to wallboards, including a binder consisting substantially of lignocellulose gelatinized by mechanical disintegration. The gelatinized lignocellulosic binder is preferably disintegrated in the presence of water and caustic soda. Another cellulose composition is described in British Pat. No. 892,744 to Durel, Incorporated. The article produced is made by heating in an essentially dry mixture comprising comminuted lignocellulose and a gaseous agent under superatmospheric pressure.

The literature also describes processes employing materials such as hydrogen peroxide in bleaching whole-wood fibers. For example, patents such as U.S. Pat. No. 2,872,280 to Kindron; 3,023,140 to Textor; and 3,069,309 to Fennell, describe respective bleaching processes using hydrogen peroxide, in caustic medium, the methods of both Fennell and Textor being conducted in at least one disc refiner. The Fennell process also includes the use of sulfuric acid to neutralize a portion of the caustic present. However, the subject method is conducted under alkaline conditions.

U.S. Pat. No. 3,354,825 to Goring is directed to a two-step oxidation process for bonding, for example, the surface of strips of low yield, delignified cellulose pulp fibers. The first step of the process includes oxidizing the surfaces by treatment in a substantially dry state with ozone. Preferably, the ozonation step is conducted, on the basic side, in the presence of gaseous ammonia. The second step includes pressing together the above treated cellulose surfaces, in the presence of moisture, and drying the pressed surfaces to promote surface bonding. A number of problems are inherent in the Goring process. Controlling the relative homogeneity of the oxidized cellulose is difficult since regulating the relative gas phase contact between the ozone and the fibers, respectively, is quite an intricate task. It is also a problem to determine the quantitative amount of oxidation actually occurring on the treated surface. Furthermore, from a qualitative standpoint, reactivity is a problem due to relatively poor control of the fiber-gas phase contact zone, which can result in uneven oxidative distribution. However, if one were to increase the amount of gaseous ozone charged to the contact zone in an effort to promote higher quantitative and qualitative oxidation, the result could probably be undesirable degradation of the cellulose structure and an increase in the overall cost of materials. Another drawback to the Goring process is the question of overall oxidation of the sheet. If, for example, the sheets employed were of sufficient thickness, surface treatment of the sheet followed by the application of heat and pressure would not effectively bond the entire sheet structure but, instead, would result in an uneven treatment thereof, i.e., an overtreatment of the surface and undertreatment of the inner core (stratified bonding).

Finally, Stofko et al., of the University of California, Forest products Laboratory, have described a process for forming bonded whole-wood products, such as plywood and particle board, by joining the respective surfaces of the whole-wood board, or pieces thereof, by topichemical oxidative treatment of these surfaces employing a liquid carrier containing an oxidant, followed by pressing the surface-modified whole-wood under heat and pressure. The process specifically includes spraying the respective whole-wood surfaces with a solution of hydrogen peroxide and sulfuric acid (with or without a catalyst), followed immediately by hot-pressing of the respective bondable surfaces. The problems outlined in connection with the Goring patent are again manifested in the Stofko et al. process with respect to homogeneity, quantitative amount of oxidation, qualtitative oxidative distribution, degradation of the sheet on aging, and, finally, the problem of stratified bonding.

SUMMARY OF THE INVENTION

The present invention relates to a novel process for producing reactive, homogeneous, self-bondable lignocellulosic fibers capable of subsequently being bonded to form sheet products having improved wet- and dry-strength properties. The process contemplates subjecting individual lignocellulose fibers, which are separated, in general, from whole-wood or whole-wood particles, to an oxidative modification step which includes contacting the fibers with an oxidative reagent system in an amount sufficient to effectively produce the subject reactive, homogeneous, self-bondable fibers. A particlular feature of this invention provides for the oxidative modification step to be conducted in a controled manner and, if desired, may furthermore provide for the controled modification step to be accomplished employing a hereinafter defined confrication step. Confrication for purposes of this invention is defined as mechanical treatment causing interfiber frictional forces to be imparted between the respective fibers, oxidatively-modified lignocellulosic fibers being rapidly formed. More specifically, when the above confrication step is employed, the oxidative reagent system is added either prior to, during, or subsequent to confrication, although it is preferred that the confrication step be conducted in the presence of the reagent system. And, as opposed to prior art hit-and-miss techniques, the amount of oxidative reagent added can also be controled within prescribed limits, depending upon the nature of the system employed. In addition, the subject oxidative modification is advantageously conducted using a liquid-phase reagent system. Preferably, the liquid-phase reagent system is formed of an oxidizing agent in an acid medium. If any substantial amount of acid remains associated with the sheet after formation, degradation of the sheet, on aging, will result. Therefore, in accordance with the teachings of this invention, in order to prevent substantial deterioration of the bonded sheet on aging, a substantial amount of any residual chemical reagent present is removed prior to performing the subsequent bonding step.

Having undergone oxidative modification, the reactive, homogeneous, self-bondable product fibers are then recovered in yields of at least about 80% by weight, based on the weight of individual, separate fibers employed and, preferably, at least about 90% by weight. The sheet products formed, in whole or in part, from the subject fibers exhibit at least comparable strength properties to corresponding sheets prepared by more expensive, conventional methods even though the subject sheets are produced employing relatively mild formation conditions, requiring lesser amounts of heat and pressure than commercially available heat-pressure fused sheets, or sheets prepared employing expensive, resinous binders (see, also, Example 1). Moreover, because the subject sheets are self-bondable, the addition to the fibers, prior to bonding, of expensive bonding agents, such as phenol-formaldehyde and urea-formldehyde resins and the like, is not required in making sheets having commercially desirable strength properties. The ability to form sheets having excellent wet- and dry-strength properties, at relatively mild bonding conditions, resides to a great extent in the fact that the above modified lignocellulose exhibits a higher qualitative degree of reactivity and homogeneity. Reactivity and homogeneity are related to the quantitative amount of oxidative modification of the subject lignocellulosic fibers. Therefore, the more reactive and homogeneous the oxidative modification, the stronger the bonding interaction of the modified lignocellulose fibers on sheet formation. Accordingly, the relative degree of reactivity and homogeneity of the subject oxidatively-modified lignocellulose fibers can be readily ascertained by comparing the relative strength properties of the sheets formed therefrom with comparable untreated sheets. For example, as will be hereinafter described, high relative wet- and dry-bonding strengths are obtained when the modified lignocellulosic fibers of the present invention are employed in sheet formation. An unexpectedly dramatic increase is evidenced in wet-strength bonding efficiency (BE) of the lignocellulosic fibers oxidatively modified according to the process of the present invention, as compared to their unmodified fibrous counterparts. Wet-strength bonding efficiency (BE) is calculated for purposes of this invention, by experimentally determining the value of various wet-strength physical properties of a sheet formed from the requisite modified fibers, such as tensile strength and internal bond, and dividing that value by the comparable experimentally determined wet-strength values of similar sheets prepared from the same feed fibers, which have not undergone prior oxidative modification. The resultant quotient is then multiplied by 100. For purposes of illustration, if sheets prepared from modified and unmodified fibers exhibit the same tensile strength value, the bonding efficiency ($BE_{TS}$) would be equal to 100%. Finally, the problem of overall oxidation of sheets of varying thickness associated with the prior art has been overcome by the process of this invention since, instead of oxidatively treating the sheet, itself, a novel, homogeneous, oxidatively-modified lignocellulosic fiber is first provided which, on sheet formation, is bonded in a substantially similar manner throughout the entire sheet structure, without any substantial stratified bonding, to provide commercially required, high strength properties.

DETAILED DESCRIPTION OF DRAWING

Figure 1:
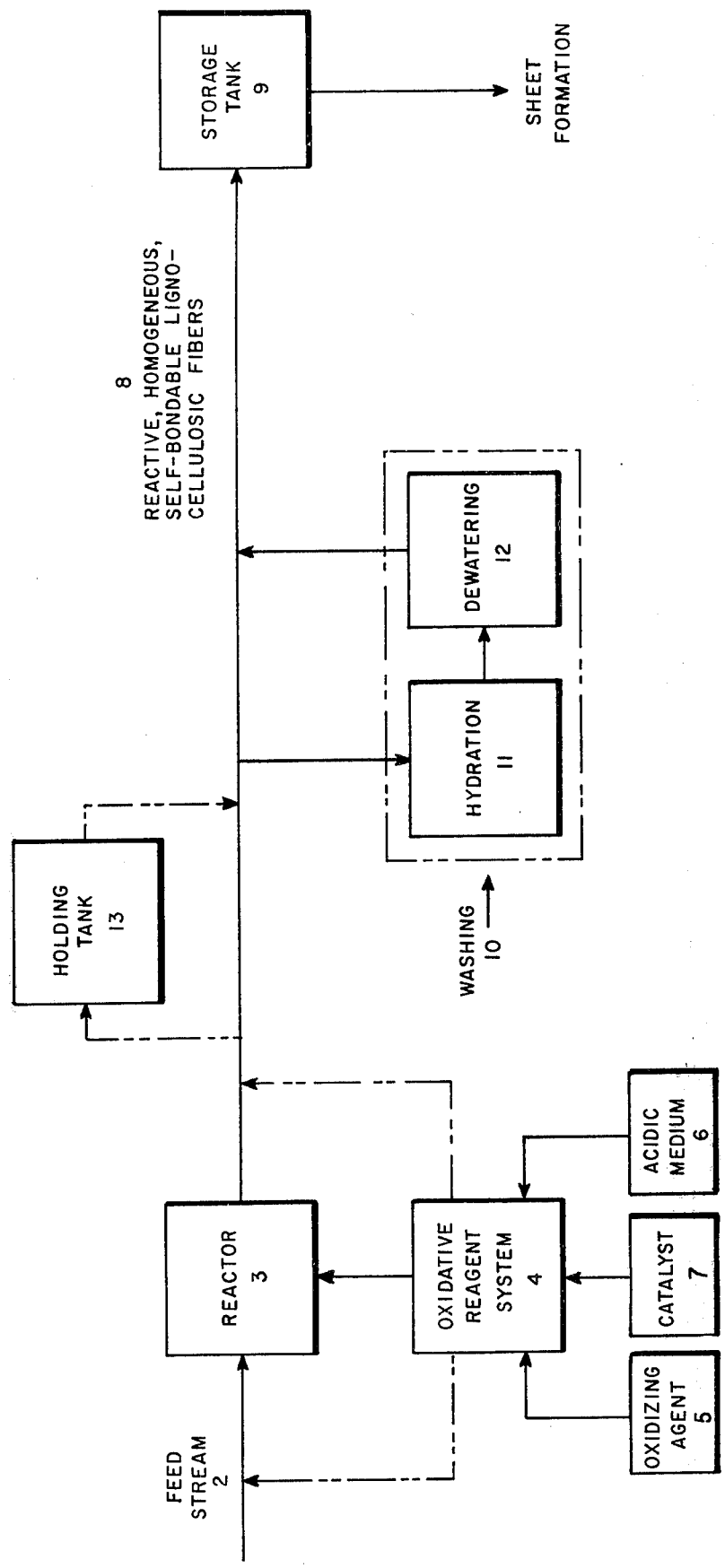

FIG. 1 is a schematic flow sheet in block form, illustrating the process of the present invention, the illustrative material contained within the dotted area representing modifications of the process.

DETAILED DESCRIPTION OF THE INVENTION

Referring now to FIG. 1, a stream of individual, separate, lignocellulosic fibers 2 are employed to provide the feed stock to reactor 3. Any material capable of providing lignocellulose fibers can be employed in forming feed stream 2. For instance, a whole-wood lignocellulosic fiber source can be separated into respective individual fibers prior to, or during, the course of the oxidative modification step. In any case, the modification step, in order to be effective, must be conducted on individual, separated fibers as opposed to whole-wood boards, or pieces thereof. Suitable sources from which individual, separate, lignocellulosic fibers can be derived include the usual species of coniferous pulp woods such as spruce, hemlock, fir, pine, and the like, and deciduous pulp wood such as poplar, birch, cottonwood, alder, etc., as well as fibrous, woody plants exemplified by cereal straws, corn stalks, bagasse, grasses, and the like. Individual, separate, lignin-containing woody fibers, as well as wood chips, or other material formed from whole-wood by mechanical means, which are subsequently separated into individual lignocellulose fibers, are the preferable form in which the feed is employed. In order to overcome increasing wood costs, and to expedite compliance with numerous ecological criteria, wood materials such as waste wood, hog fuel, limbs, and mixtures thereof, can be employed, in whole or in part, as a lignocellulose fiber source. For example, fibers obtained from low-grade saw material residues, sawdust, plywood trim, and planer ends and shavings, can be effectively employed.

It is contemplated that lignocellulosic fibers having a weighted average fiber length (millimeters), measured according to TAPPI Standard T-233 Su-64, of at least about 0.5 millimeters and, preferably at least about 1 millimeter, up to about 5 millimeters, and preferably up to about 3 millimeters.

Consistency, as defined herein, refers to the percent by weight on a dry basis of lignocellulosic fibers in feed stream 2. The consistency of the cellulose feed, which is normally prepared as an aqueous slurry, is preferably adjusted, in the case where, for example, confrication is employed, to a relatively high level so that intimate contact of the respective fiber surface can be maintained. More specifically, consistencies ranging from at least about 10% up to about 60%, and preferably from at least about 15% up to about 45%, are advantageously employed.

If a high consistency lignocellulosic feed is employed, it is in a semisolid state, and is generally considered nonpumpable. Therefore, a device capable of transporting this relatively immobile feed, such as a screw conveyor or the like, is used to convey the high consistency material to reactor 3.

Although reactor 3 can be of any type capable of promoting the oxidative modification of the individual fibers of lignocellulose, either prior to, during, or subsequent to treatment therein, it is preferred that the modification step be conducted in a controled manner and, in addition, that it be performed substantially within the confines of reactor 3. Furthermore, reactor 3 is preferably of a type capable of transmitting an amount of energy sufficient to impart the hereinafter described requisite degree of confrication to the lignocellulose feed fibers. The application of high energy confricating forces to the fibers provides the basis for conducting the oxidative modification step in a particularly controlled manner thus producing extremely high yields of the requisite reactive, homogeneous, self-bondable lignocellulosic fibers of the present invention, designated in FIG. 1 as 8. Although the amount of energy imparted to the fibers during confrication is relatively high, it is preferable that a reactor be chosen which does not substantially destroy the fibrous identity of lignocellulosic feed stream 2. An example of such a reactor which can impart the requisite controled, oxidative modification is a disc refiner, such as the Bauer 415. This is substantially the same refiner, in principle, as the one disclosed in U.S. Pat. Nos. 2,214,704 and 2,568,783, respectively. Operation of the disc refiner, in a mechanical sense, is specifically disclosed in the aforementioned patents.

The amount of energy imparted to the high consistency feed stream, in a preferable case, must be of sufficient magnitude to provide controled, oxidative modification and, more preferably, to provide confrication. More specifically, the power input, number of passes, and feed rate of the lignocellulose fibers are maintained, depending on the type and quality of the feed stock, so that the minimum average amount of energy imparted to the fibers per pass through the reactor is at least about 8 horsepower days per ton, i.e., the total daily horsepower required to produce one ton of product, of air-dried lignocellulose fibers, and preferably at least about 20 HPD/T per pass. An upper energy limit of about 40 HPD/T per pass and preferably up to about 35 HPD/T per pass should be maintained.

In producing lignocellulosic fibers 8, an oxidative reagent system 4 is employed in conducting the oxidative modification of feed stream 2. As shown in FIG. 1, oxidative reagent system 4 may be added to lignocellulosic feed stream 2 prior to, in, or subsequent to, reactor 3. However, in order to maximize the oxidative modification step, reagent system 4 is preferably added directly to reactor 3. Oxidative reagent system 4 is preferably a liquid-phase system comprising an oxidizing agent 5 in an acidic medium 6, Preferably, the acidic medium 6 is a dilute acid such as dilute sulfuric acid and the like. A preferred, compatible, oxidizing agent 5, for example, includes peroxides, such as hydrogen peroxide. However, other compatible oxidizing agents such as persulfates, chlorates, and the like, can also be employed. A catalyst 7, depending upon the oxidation system employed, is preferably included. In the case of hydrogen peroxide and sulfuric acid systems, for instance, a metallic ion such as a transition metal compound, preferably iron, can be effectively employed.

The amount of oxidizing components added to the reactor generally varies, depending on the reaction conditions of the choice of reagents. In any case, however, the individual, separate lignocellulosic fibers 2 must be contacted with oxidative reagent system 4, in an amount sufficient to effectively produce said reactive, homogeneous, self-bondable fibers 8 which, in turn, on bonding under the hereinafter prescribed mild conditions, form sheets having physical properties similar to, or greater than, commercial sheet materials presently produced. More specifically, an amount of oxidative reagent is employed which is sufficient to provide a minimum degree of oxidative modification to the individual lignocellulosic fibers, but to an extent which is insufficient to cause substantial damage to the cellulose structure of the fiber, thereby detrimentally affecting the physical properties of the subsequently formed sheets. The sufficiency and extent of oxidative modification can be gauged by determining the bonding energy of a given product fiber. For example, if the $BE_{TS}$ and/or the $BE_{IB}$ of a given modified sample is at least about 150%, and preferably greater than 200%, then the requirement with respect to the sufficiency and extent of oxidative modification is considered to have been achieved. Again, if hydrogen peroxide and sulfuric acid form oxidizing system 4, each of these respective components is preferably added in an amount of at least about 0.5% by weight, and preferably 1.5% up to about 10% by weight, and preferably 5% based on the O.D. weight of individual, separate lignocellulosic fibers 2.

Unless oxidative reagent system 4 is added subsequent to reactor 3, as previously described, reactive, homogeneous lignocellulosic fibers 8 will preferably exit from reactor 3 and be transported directly to storage tank 9, where they are stored awaiting sheet formation. If, however, the oxidative modification is not substantially complete, the fibers are diverted to a holding tank 13, where they are retained for a short period of time to expedite completion of the previously described oxidative modification, and then conveyed to storage tank 9.

Reaction conditions, such as pressure and temperature, will vary, depending on the oxidative reagent system employed. For example, temperatures of at least about 120° up to about 160° F. are preferred for the above hydrogen peroxide-sulfuric acid system.

The total reaction time required for conducting oxidative modification step varies, but, preferably, it will range from at least about 1/30 up to about ½ hour, and more preferably up to about ¼ hour.

Product 8, assuming that a substantial amount of residual oxidative reagent is associated therewith, is then subjected to a washing step 10 prior to entering storage tank 9. As previously stated, the purpose of this step is to prevent deterioration of the bonded sheet on aging. The presence of dilute acid, for instance, will cause deterioration of the sheet. More specifically, this step, generally shown at 10 in FIG. 1, is preferably accomplished by conducting a hydration step 11 to form a slurry having a consistency of up to about 6% by weight, which is then followed by a dewatering step 12. Accordingly, the consistency of the material in storage tank 9 is at least 40% by weight, and preferably at least 50% by weight.

Product 8 is then bonded, employing a combination of heat and pressure, using standard sheet formation techniques known in the industry.

As previously stated, sheets can be produced, using lignocellulosic fibers 8 which require the application of significantly less bonding energy than required in comparable conventional processes. For example, water-resilient fiberboard sheets having a thickness of about 150 mils can be produced, employing lignocellulosic fibers 8, employing bonding temperatures of only at least about 250° F., and preferably about 275°, up to about 400° F., and preferably up to about 325° F. Contrarily, similar, standard fiberboard sheets, with or without resinous binders such as phenolformaldehyde resins and urea-formaldehyde resins, require temperatures of about 400° F. to achieve the same minimum levels of tensile strength. Even more dramatically, the above subject can be produced at pressures of as little as at least about 25 psi and preferably at least 100 psi, up to about 400 psi, and preferably up to about 300 psi. The aforementioned standard fiberboard products require pressures of from about 700–1500 psi to meet minimum commercial strength requirements.

Sheets of varying thickness can be made employing oxidatively-modified fibers 8. This is not the case, as previously pointed out, where modification is provided topochemically to only the surface of a preformed sheet. More specifically, sheets having a thickness of several mils (paper), or about 15 mils (linerboard), or from about 15 mils up to about 100 mils (fiberboard), or hardboard sheets having a thickness greater than about 100 mils, can all be readily produced from the subject fibers. However, sheets having a thickness of at least 25 mils, and preferably at least 100 mils, are the most desirable. Maximum thickness limitations in the production of a given sheet, employing lignocellulosic fibers 8, are dictated by the limitations of the sheet-forming equipment used to impart the requisite mild heat and pressure during the bonding step. For example, sheets having a thickness of up to about 5000 mils could be produced if a compression step were employed in the first instance wherein the fibers were subjected to the requisite amount of pressure, followed by a separate heating step conducted sequentially thereafter, or at a later point in time. However, from the standpoint of present commercial production, sheets having a thickness of up to about 1000 mils, and preferably up to about 750 mils, are most desirable.

EXAMPLE 1

To illustrate the process and the novel, lignocellulosic fibrous product of this invention, the following experiments were conducted:

A total of 10 pounds of hemlock chips (48.5% O.D.), and a mixture of 10 pounds of 2% solution of sulfuric acid and one pound of 15% by weight hydrogen peroxide were metered over a total time period of about 1/30 hour through the central duct or eye of a 24-inch double-disc Baurer 415 high consistency refiner into a working space formed between a pair of rotatable discs. The above amounts of sulfuric acid and hydrogen peroxide are equivalent to about 2% and about 1.5% by weight, respectively, based on the weight of over-dried hemlock chips. Each of the above discs carried a movably mounted, roughened surface, refining plate section. The nominal consistency of the feed, measured at the exit of the refiner, was about 32%. The discs were rotatable in opposite directions about a fixed, common axis by suitable power means. The roughened surfaces were in relatively high motion with respect to each other and spaced and maintained apart at a distance not less than, and in actuality slightly greater than, the thickness of the individual fibers being treated. This spacing was maintained since it is preferred that the roughened surfaces do not substantially fracture the lignocellulosic fibers, but, instead, impart confrication thereto. The refiner surfaces were operated at a predetermined power input level of about 28 horsepower days per ton so that the desired degree of confrication was maintained.

To produce the energy required for confrication, the relative movement between the two surfaces will vary depending upon the type of apparatus employed. In general, the surfaces should operate at a relative tangential velocity of no less than about 1000 ft/minute, and the rotation should be about a fixed axis to obviate relative gyratory movement which causes balling of the fibers. When one of the surfaces is stationary, the relative tangential velocity of the surface should preferably be at least 5000 ft/minute, and in the case where both surfaces are moving in opposite directions, a relative tangential velocity of at least 15,000 ft/minute is preferred. Under all conditions, the velocity between the refiner surfaces should be sufficiently great so as to impart sufficient energy to the fibers to effect confrication and, at the same time, provide sufficient energy to move the fibers through the refiner. The two surfaces between which the pulp is treated should preferably be roughened by providing projections of such character as to engage the high consistency pulp.

Although the average operating pressure imparted by the refiner surfaces on the cellulosic fibers may vary, an average pressure of between 5 to 20 pounds/in$^2$ will be sufficient to produce a pulp of desired physical and chemical properties.

The pulp then is moved rapidly and continuously in a single pass through the work space, in a direction away from the point of introduction, toward the point of discharge, oxidatively-modified lignocellulosic fibers being rapidly formed therein.

The modified lignocellulosic product was collected from the refiner and retained, at about 100° to 150° F. for a period of about 1/3 hour. At the end of that time, three 882-gram samples (about 280 g. O.D.), identified as A-C, were recovered, diluted to a consistency of about 4%, and stirred for about 15 minutes. The respective low consistency slurries were then filtered. A damp filter cake was then formed and transferred to a die press made from a piece of ¾ inch stainless steel plate. The samples were pressed to remove excess moisture, the resulting consistency being about 50% O.D. Thus, a substantial amount of the unreacted oxidative reagent system was removed prior to bonding. The pressed samples A–C (see Table I) illustrate the mild bonding conditions employed in forming standard hardboard sheets (about 150 mils thickness) according to the present invention, and compare these samples with respect to dry-strength properties to sheets made by conventional methods. Although other tests were conducted, the data shown in Tables I and II, respectively, is considered to be indicative of typical sheets made by this invention.

Table I

| Sample | Temperature (°F.) | Pressure (psi) |
|---|---|---|
| A | 250 | 200 |
| B | 275 | 200 |
| C | 300 | 200 |

Dry-strength tests were then conducted on each of the samples according to ASTM No. D1037–64, the results being tabulated as follows:

Table II

| Sample | Dry Tensile Strength (psi) | Dry Internal Bond (psi) | Dry Modulus of Rupture (psi) |
|---|---|---|---|
| A | 3,035 | 314 | 5,683 |
| B | 3,567 | ** | 5,990 |
| C | 2,801 | 207 | 4,159 |
| Conventional Sheets* | 2,500 | 150 | 4,000 |

* American Hardboard Institute Standard - dry-strength values for about 150-mil sheet
** Value not coextensive with other data and, based on this and other experiments, is considered to be the result of experimental error in testing.

As shown in Table II, dry-strength values for sheets made from the subject lignocellulosic fibers are equivalent to or substantially greater than the industrial specifications for comparable fused sheets or for sheets containing binders such as phenol-formaldehyde or urea-formaldehyde resins, i.e., dry tensile strength of at least 2500 psi, dry internal bond strength of at least 150 psi, and dry modulus of rupture of at least 4000 psi, even though the temperatures and pressures employed during bonding are only 250° to 300° F., and 200 to 300 psi, far less than the hardboard industry standard, i.e., a temperature of at least about 400° F. and a pressure of at least about 700 psi. Hardboard sheets of excellent quality were also formed employing bonding pressures as low as 25 psi and at temperatures of about 275°–300° F.

EXAMPLE 2

The followng experiments were conducted to demonstrate the ability of the subject process to produce reactive, homogeneous, self-bondable fibers. Therefore, the runs tabulated in Table III employed lignocellulosic fibers oxidatively modified, according to the process of the present invention. Sheets were then formed from the subject oxidatively-modified fibers and compared with respect to wet-strength properties with the same feed fibers which have not undergone oxidative modification, as provided by the process of this invention, the resultant figures being employed to calculate the respective BE values at differing process conditions. The sheets were formed at relatively mild process conditions and did not include any synthetic binder.

Samples were prepared by the procedure described in Example 1 and tested for wet strength according to the method of ASTM D1037–64, except that a 2-hour soaking period, instead of the normal 24-hour soaking period, was provided in order to expedite testing. However, an even greater difference between the respective treated and untreated fiber sheets is expected if a 24-hour soaking period were, in fact, employed, since little or no wet strength will be retained by the sheets formed from the untreated fibers. Varying sheet-formation temperatures and pressures, as well as differing oxidation system compositions, are shown in Table III, the previously defined wet-strength bonding energy (BE) being employed as the measure of comparison for the respective modified and unmodified fibers.

Table III

| Sample | Temperature (° F.) | Pressure (psi) | $BE_{TS}$ % | $BE_{IB}$ % |
|---|---|---|---|---|
| A | 250° F. | 200 | *** | *** |
| B | ↓ | ↓ | 274 | 400 |
| C | ↓ | ↓ | 490 | 650 |
| D | ↓ | ↓ | 458 | ** |
| A | 275 | 200 | 362 | > 200* |
| B | ↓ | ↓ | 351 | > 286* |
| C | ↓ | ↓ | 548 | > 1,060* |
| D | ↓ | ↓ | 555 | 1,085 |
| A | 300 | 200 | ** | 270 |
| B | ↓ | ↓ | ** | > 240* |
| C | ↓ | ↓ | ** | > 390* |
| D | ↓ | ↓ | ** | 1,040 |
| A | 250 | 350 | 323 | 250 |
| B | ↓ | ↓ | 348 | > 433* |
| C | ↓ | ↓ | 765 | > 333* |
| D | ↓ | ↓ | 353 | 1,417 |

| Sample | Composition |
|---|---|
| A | 2% $H_2SO_4$, 1.5% $H_2O_2$ |
| B | 2% $H_2SO_4$, 1.5% $H_2O_2$, 0.1% Fe |
| C | 5% $H_2SO_4$, 3.0% $H_2O_2$, 0.1% Fe |
| D | 5% $H_2SO_4$, 5.0% $H_2O_2$, 0.1% Fe |

* Test sample failed at point of adhesion of respective sheet surfaces before sheet Table III-continued

| Sample | Temperature (° F.) | Pressure (psi) | $BE_{TS}$ % | $BE_{IB}$ % |
|---|---|---|---|---| itself failed. Therefore, actual value of internal bond of subject sheet is greater than wet-strength value shown.
 ** Value not coextensive with other data and based on this and other experiments is considered to be the result of experimental error in testing.
 *** Due to experimental malfunction, data for this run is not available.

The above data clearly demonstrates that significant increases in wet strength is realized when employing the reactive, homogeneous, self-bondable fibers produced by oxidative modification according to the process of the subject invention. $BE_{TS}$ and $BE_{IB}$ values of at least 150%, and preferably at least 200%, have been provided while employing minimum temperature, pressure and oxidative reagent system levels. And, when preferred reaction conditions are employed, respective values of at least 250% are achieved.

EXAMPLE 3

The process of Example 1 was repeated, using a refiner feed comprising sawmill waste, i.e., 60% sawdust, 25% planer ends, and 15% shavings, as the feed fiber source. Sheets were formed at temperatures of 270° F. (Table IV-A) and 300° F. (Table IV-B), at a pressure of 200 psi, the dry-strength physical properties being as follows:

Table IV

| Sample | Temperature (° F.) | Pressure (psi) | Tensile (psi) | Internal Bond | Modulus of Rupture |
|---|---|---|---|---|---|
| A | 275 | 200 | 1,492 | 126 | 2,573 |
| B | 300 | 200 | 2,183 | 378 | 3,651 |

The results of the above runs clearly demonstrate that even when low-grade lignocellulose material is employed as the fiber source, sheets having excellent strength properties can be provided.

What is claimed is:
1. A process for producing reactive, homogeneous, self-bondable, lignocellulosic fibers, capable of subsequently being bonded to form sheet products having improved wet- and dry-strength properties, which comprises subjecting individual, separate fibers of lignocellulose to a controled oxidative modification step, including a confrication step, which includes contacting said individual, separate fibers with an oxidative reagent system in an amount sufficient to effectively produce said reactive, homogeneous, self-bondable, lignocellulosic fibers.
2. The process of claim 1, wherein said confrication step is conducted in the presence of said oxidative reagent system.
3. The process of claim 2, wherein a liquid-phase oxidative reagent system is provided.
4. The process of claim 3, wherein said liquid-phase oxidative reagent system comprises an oxidizing agent in acidic medium.
5. The process of claim 4, wherein the oxidizing agent and acidic medium, respectively, are each provided in an amount of from about 0.5 to about 10% by weight, based on the weight of lgnocellulosic feed fibers employed.
6. The process of claim 4, wherein said oxidizing agent is hydrogen peroxide and said acidic medium is sulfuric acid.

7. The process of claim 4, wherein the liquid-phase reagent system includes a catalyst.

8. The process of claim 1, wherein the catalyst employed is iron.

9. The process of claim 1, wherein the yield of said oxidatively-modified lignocellulosic fibers is at least about 80% by weight, based on the weight of said individual lignocellulose feed fibers employed.

10. The process of claim 1, wherein the average amount of energy imparted to said fibers during said confrication step, per pass, is at least about 8 horsepower days per ton up to about 40 horsepower days per ton.

11. The process of claim 1, wherein the reaction time for conducting the controlled oxidative modification step is at least about 1/30 hour up to about ½ hour.

12. The process of claim 1, wherein a consistency of at least about 10 up to about 50% by weight, based on the total dry weight of individual lignocellulosic fibers in said feed, is maintained during said confrication step.

13. The process of claim 1, wherein a substantial amount of any residual oxidative reagent associated with said reactive, homogeneous, self-bondable lignocellulosic fibers is removed, prior to said subsequent bonding step.

14. The process of claim 1 further characterized in that said oxidative modification step provides reactive, homogeneous, self-bondable, lignocellulosic fibers which can be formed into said improved sheet products by conducting said subsequent bonding step at a pressure from about 25 psi up to about 400 psi.

15. The process of claim 1 further characterized in that said oxidative modification step provides reactive, homogeneous, self-bondable lignocellulosic fibers which can be formed into said improved sheet products by conducting said subsequent bonding step at a temperature of from about 250° F. up to about 400° F.

16. The process of claim 1, wherein said product fibers are bonded to form a sheet having a dry tensile strength of greater than about 2500 psi.

17. The process of claim 1 further characterized in that subsequent to effecting said oxidative modification step, said reactive, homogeneous, self-bondable lignocellulosic fibers produced have a $BE_{TS}$ of at least about 150%.

18. The process of claim 1 further characterized in that subsequent to effecting said oxidative modification step, said reactive, homogeneous, self-bondable lignocellulosic fibers produced have $BE_{IB}$ of at least about 150%.

19. The process of claim 1, wherein the $BE_{TS}$ and $BE_{IB}$, respectively, of the reactive, homogeneous, self-bondable lignocellulosic fibers produced is at least about 200%.

20. The process of claim 1, wherein said product fibers are bonded to form a sheet having a dry internal bond of greater than about 150 psi.

21. The process of claim 20, wherein the resulting dry modulus of rupture of the sheet produced during said bonding step is greater than about 4000 psi.

22. A process of forming homogeneous, self-bondable, lignocellulosic fibers, capable of subsequently being bonded to form sheet products having improved wet- and dry-strength properties, which comprises:
   a. introducing lignocellulose, at high consistency, and an oxidative reagent system into a work space formed within a high energy reactor between a pair of rotatable discs, said discs including means for confricating said high-consistency cellulose in the presence of said oxidative reagent system; and
   b. subjecting said lignocellulose to a controled oxidative modification step, including confricating said cellulose and oxidative reagent system, respectively, to a degree sufficient to form said homogeneous, self-bondable, lignocellulosic fibers.

23. The process of claim 22, wherein said confrication step is conducted in a disc refiner.

24. The process of claim 23, wherein the consistency of said lingnocellulose is from about 15 to about 45% based on the dry weight of fibers in the feed.

25. The process of claim 23, wherein the amount of energy imparted to the cellulose during said confriction step is from about 8 HPD/T to about 40 HPD/T.

26. The process of claim 25, wherein the amount of energy is from about 15 HPD/T to about 25 HPD/T.

27. The process of claim 23, wherein a liquid phase oxidation system is provided comprising an oxidizing agent in acidic medium.

28. The process of claim 27, wherein said oxidizing agent is hydrogen peroxide and said acid medium is sulfuric acid.

29. The process of claim 27, wherein said liquid phase oxidation system further includes a catalyst.

* * * * *